June 12, 1956 G. C. SZIKLAI 2,750,440
SYNCHRONOUS DETECTION AT INTERMEDIATE
FREQUENCY LEVEL OF COLOR SUBCARRIER
Filed Aug. 29, 1951
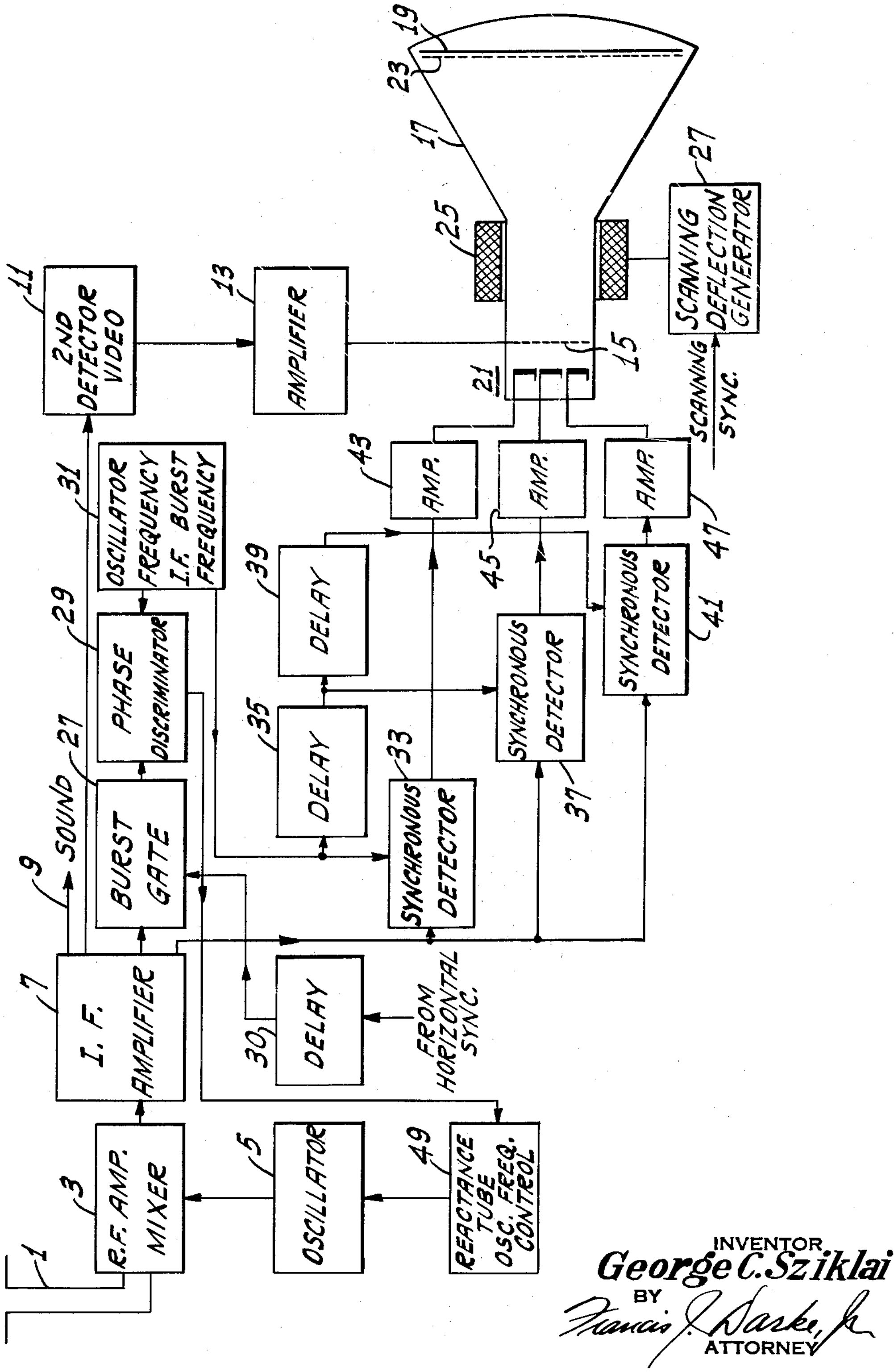
INVENTOR
George C. Sziklai
BY
Francis J. Darke, Jr.
ATTORNEY 2,750,440

SYNCHRONOUS DETECTION AT INTERMEDIATE FREQUENCY LEVEL OF COLOR SUB-CARRIER

George C. Sziklai, Princeton, N. J., assignor to Radio Corporation of America, a corporation of Delaware Application August 29, 1951, Serial No. 244,225

4 Claims. (Cl. 178—5.4)

The present invention relates to color television receivers and more particularly to color television receivers of the type adapted to receive and demodulate color television signals of the form wherein color information is transmitted on a phase and amplitude modulated sub-carrier signal whose frequency is within the brightness signal frequency band.

Color television systems generally provide for the transmission and reception of video signals representative of not only relative luminescences or brightness but also the color hues and saturations or chromaticities of the details of elemental image areas contained in the original scene.

A color television system to which this invention is particularly directed has become known and will be referred to as the "phase and amplitude modulated sub-carrier wave" type.

Due to the reduced ability of the human eye to distinguish fine detail in color as compared with fine detail in brightness, it is possible to reduce the amount of color detail that must be transmitted. It is therefore, customary that only the relatively low frequency components of the video signals representative of the color hue and chroma are transmitted.

It must be remembered however, that low frequency components of brightness detail must also be transmitted in order to provide for realistic reproduction. A process of multi-plexing is therefore required to transmit both low frequency color detail and low frequency brightness detail in the same frequency band.

The phase and amplitude modulated sub-carrier wave type of color television system referred to employs a sub-carrier having a frequency within the frequency range of the brightness detail signal. This sub-carrier is modulated in phase to represent the hue of the scanned point on the image and is amplitude modulated to represent the chroma of the same scanned point of the image.

A three color television system of the phase and amplitude modulated sub-carrier type is described in an article entitled "A six megacycle compatible high definition color television system" published in RCA Review, December 1949. The system provides for the generation, transmission and reception of signals representing each of three component colors of successive elemental areas of a scanned image. The rate at which the video signals representing each of the different image colors are repeated is referred to as the color sampling frequency. The color sampling frequency is of the order of 3.58 or 3.99 megacycles. This assumes a useful video channel of 4 to 4.5 megacycles in width.

It will be seen that under certain conditions of image scanning at the transmitter there will be produced brightness signals having frequencies equal to the sub-carrier frequency and in the range of the side bands of the modulated sub-carrier. Normal detection of such over-lapping signals resulting from the multi-plexing process may under scanning of certain types of images cause spurious signals to result in interference patterns in the reproduced image.

A primary object of this invention is to provide for improved sampling of color television signals.

In the reception and demodulation of the multi-plexed video signal it is of course necessary to sample the received video signal wave in synchronism with the transmitter wave developing process. That is, it is necessary to sample the received video signal wave at the precise times that the instantaneous value of the wave represent the particular color which at that instant is being reproduced.

Another object of this invention is to provide for improved synchronism of receiver color sampling with transmitter color sampling.

According to this invention the phase and amplitude modulated sub-carrier signal carrying color information is demodulated at intermediate frequency.

Other and incidental objects of the invention will become apparent upon the reading of the following specification taken in connection with the accompanying drawing which shows by block diagram one form of the present invention.

Referring in detail to the drawing, 1 indicates a television receiver antenna suitable for the reception of radio frequency energy. Number 3 illustrates in block form a radio frequency amplifier and mixer adapted to produce an intermediate frequency signal in connection with oscillator 5. This is accomplished in the manner well known to the radio art. The intermediate frequency signal produced is amplified in intermediate frequency amplifier 7. The television antenna 1, the radio frequency amplifier and mixer 3, the oscillator 5 and the intermediate frequency amplifier 7 may be of the type employed in a conventional television receiver. It will also be understood that such a receiver may be similar to the one customarily employed for the demodulation of the presently standard black and white television signal. Such a receiver is normally responsive to a range of video frequencies extending from zero to substantially 4 megacycles.

The sound channel is indicated in the drawing at lead 9.

The brightness signal is detected in the second detector 11, amplified in amplifier 13 and applied to control electrode 15 of the color image reproducing tube 17. It is not intended to limit the practice of the present invention to any single type of color image reproducing device. For purpose of explanation of the operation of this invention, however, one type is illustrated as image reproducing tube 17 which forms the subject matter U. S. Patent No. 2,595,548, issued May 6, 1952, to Alfred C. Schroeder, and entitled "Picture Reproducing Apparatus."

The color kinescope proposed by Mr. Schroeder includes a luminescent screen 19 formed of a multiplicity of small phosphor dots of sub-elemental dimensions and arranged in groups to be capable of producing the selected component colors when excited by a particular color designated electron beam from gun structure 21. The color kinescope 17 is also provided with an apertured masking electrode 23 located between luminescent screen 19 and the gun structure 21. The apertures of electrode 23 are positioned between the particular component color dot on the phosphor screen 19 and the appropriate color designated gun of gun structure 21. Each of the guns of gun structure 21 will therefore produce only one of a plurality of color images on phosphor screen 19.

A suitable deflection yoke 25 is provided for scanning the several electron beams produced by gun structure 21. The invention is equally applicable to the single gun type of color tube which is described in an article entitled "General description of receivers for the R. C. A. color television system which employ the RCA direct-view tri-color kinescopes," published by Radio Corporation of America in April 1950.

Suitable deflection signal means is illustrated by block 27. The development of appropriate deflection signals is believed well known to the television art. Details well described may be found by referring to any television text book such as, for example, the text book entitled "Principles of Television Engineering," by Donald Fink, published by McGraw-Hill Book Company.

For the purpose of explanation of the operation of this invention and to indicate the use of the present invention in connection with the reception of black and white signals, let it be assumed that all the cathodes of gun structure 21 are biased equally and by such an amount as to cause to be produced three electron beams of equal magnitude. A modulation of grid 15 by an incoming brightness video signal will produce a black and white image on screen 19 by reason of the fact that although three separate colors are produced simultaneously, the individual color dots of screen 19 are so small that they are undistinguishable from each other by the unaided human eye at normal viewing distance. It is thus possible to obtain monochrome image reproduction from the presently standardized black and white television signal transmission.

In order to reproduce a designated color in tube 17, it is necessary to appropriately bias appropriate cathodes of the gun structure 21 in order to cause an electron beam to excite the designated color phosphors on screen 19 to the proper extent.

It will be remembered that color information is contained in a modulated sub-carrier wave having a carrier frequency located within the frequency pass band of the video signals carrying the brightness detail information. The sub-carrier wave is phase modulated in accordance with the particular component color being scanned while the same sub-carrier is amplitude modulated in accordance with the chroma of the color being scanned. The reproduction of the proper color in the receiver is therefore dependent upon accurate timing of the color sampling or selection in the receiver. Color synchronism is accomplished by the periodic transmission of a "burst" of signal wave equal in frequency to the unmodulated sub-carrier carrying the color information. The frequency of the "burst" and the unmodulated sub-carrier be of the order of 3.58 or 3.99 megacycles the transmitted burst follows immediately behind each horizontal sync pulse.

A good description of the employment of the "burst" may be found in an article entitled "Recent developments in color synchronization in the RCA color television system," published February 1950 by the Radio Corporation of America.

In the practice of this invention there is developed a gating signal timed to pass only the periodic "burst" signal through burst gate 27 to phase discriminator 29. This is accomplished by delaying the horizontal sync pulse in delay network 30 and applying to control the gate 27 the delayed sync pulse whose timing corresponds to the transmission of the "burst." The gate 27 may consist of a keyed amplifier such as a tube with two control electrodes. The signal is applied to one control electrode and the control signal, that is the delayed sync pulse is applied to the other control electrode. Circuit elements are chosen so that signal is passed only during the time of the burst.

There is provided continuously running sampling oscillator 31 having a reasonable stable frequency equal to the frequency of the burst in the intermediate frequency amplifier 7.

The signal from oscillator 31 is utilized to control a synchronous detector 33. A portion of the signal from oscillator 31 is transmitted through delay network 35 to synchronous detector 37. A portion of the output signal of delay 35 is further delayed in delay network 39 and employed to key synchronous detector 41. This delay in control signal for synchronous detectors 33, 37 and 41 causes them to operate sequentially and in phase with the respective color samplers at the transmitter.

Each of the synchronous detectors 33, 37 and 41 may, for example, consist of a multiple control electrode tube having an input signal applied from intermediate frequency amplifier 7 to one of the control electrodes while the timing control signal from oscillator 31 is applied in proper phase to another control electrode to produce at the outputs of synchronous detectors 33, 37 and 41 the appropriate color representation signals. Synchronous detectors or samplers as they are sometimes called, are well shown and described in detail in an article entitled "A simplified receiver for the RCA color television system" published by Radio Corporation of America in February 1950.

The respective component color signals are then amplified in amplifiers 43, 45 and 47 for application to appropriated color designated cathodes of cathode gun structure 21.

Not only is the signal from oscillator 31 employed to time synchronous detectors 33, 37 and 41, but the frequency of oscillator 31 is compared with the "burst" intermediate frequency in phase discriminator 29 to provide a control voltage for reactance tube 49 which in turn controls the heterodyning oscillator 5. The manner in which the frequency of oscillator 5 is controlled by reactance tube 49 is well known to the radio art. Although such a frequency control is provided for oscillator 5, any of the well known frequency control arrangements may be provided for oscillator 5. By comparing the "burst" intermediate frequency obtained in burst gate 27 with the frequency of the oscillator 31, a control voltage is developed in phase discriminator 29 to control the frequency of heterodyning oscillator 5 so that both the frequency and the phase of the intermediate frequency of the "burst" is equal to the frequency of sampling oscillator 31.

For the purpose of explanation, let it be assumed for example that the picture carrier of the incoming R. F. signal is at 200 megacycles and the oscillator 5 is adjusted to oscillate at 160 megacycles, thus providing a picture carrier intermediate frequency of 40 megacycles. If a sub-carrier and burst frequency of 3.99 is employed, the burst is received at 203.99 megacycles. The I. F. amplifier 7 and the burst gate 27 will pass a signal of 43.99 megacycles following each horizontal sync pulse. If oscillator 31 is oscillating at 43.99 megacycles and in proper phase with the intermediate "burst" frequency the phase discriminator 29 will provide no change to the frequency of oscillator 5 through reactance tube 49. However, if the phase or frequency of sampling oscillator 31 deviates from the proper phase or frequency of the intermediate frequency "burst" signal of 43.99 megacycles a control voltage will be produced in reactance tube 49 to change heterodyning oscillator 5 to develop a new intermediate frequency of the burst and sub-carrier to correspond with the phase or frequency of oscillator 31. In this form of the invention, it is important to note that the frequency of the heterodyning oscillator 5 is controlled and not the frequency of sampling oscillator 31.

It will be seen that it is not necessary to maintain oscillator 31 at any particular frequency but it is essential for proper color reproduction to maintain the intermediate frequency of the unmodulated sub-carrier equal to and in a proper phase relationship to the frequency of oscillator 31.

In the example given above, a heterodyning oscillator frequency was chosen which was below the R. F. carrier. However, a heterodyning oscillator frequency may be chosen which is above the R. F. carrier in which case the sampling oscillator frequency will be equal to the I. F. frequency minus the "burst" frequency instead of plus the burst frequency.

It will be seen, therefore, that the present invention does not necessitate an oscillator of a rigidly fixed frequency but permits the use of an oscillator whose frequency might vary.

It is also possible in accordance with another form of this to apply frequency control to the sampling oscillator 31 in the same manner with or without controlling the frequency of heterodyning oscillator 5.

The application of the brightness signal to the control electrode and the color information signal to the cathodes is by way of example only. The signals may be combined and utilized in any way desired without departing in spirit from the invention.

Certain frequencies were referred to in the description of the present invention. It is not intended that the practice of the invention should be limited to any such values, as typical values were given for illustration only.

It will be seen from the above description that among other, the following advantages may be gained from the practice of this invention.

The frequency separation of the sub-carrier which is to be detected and the detected color video signals are widely separated. This wide separation makes the exclusion of the output signal into the input signal and vice versa very effective even with a minimum amount of reactance elements.

Due to the high frequency of the reference signal and the synchronous detectors, small and economical delay means can be used in the color channel.

Due to the fact that color detection takes place in an intermediate frequency form, the output of the synchronous detectors will be inherently linear.

Due to the control of the local heterodyning oscillator and the high gain of the intermediate frequency amplifier a high loop gain can be obtained for the control of the burst without additional expense.

A precise automatic tuning means is provided for a receiver if intercarrier type of sound reception is used.

Having thus described the invention, what is claimed is:

1. A color television receiver adapted to receive signals of the type wherein color information is transmitted in the form of a phase and amplitude modulated sub-carrier and wherein a burst of color synchronizing frequency signal is periodically transmitted, said receiver including a mixer, a heterodyning oscillator for said mixer, an intermediate frequency amplifier coupled to said mixer, color image reproducing means, a synchronous detecting means for each of a plurality of selected component colors, each of said synchronous detecting means connected to said intermediate frequency amplifier to receive signal energy therefrom, a sampling oscillator, the frequency of said sampling oscillator lying within the frequency to which said intermediate frequency amplifier is responsive, said sampling oscillator coupled to key said synchronous detectors in sequence and at a frequency equal to the intermediate frequency of said burst of color synchronizing signal.

2. The invention as set forth in claim 1 and wherein there is included means for maintaining the phase and frequency of said sampling oscillator and the intermediate phase and frequency of said burst of color synchronizing signal equal to each other.

3. The invention as set forth in claim 1 and wherein there is included automatic frequency control means connected to said heterodyning oscillator for maintaining the phase and frequency of said sampling oscillator and the intermediate phase and frequency of said burst of color synchronizing signal equal to each other.

4. The invention as set forth in claim 1 and wherein there is included automatic frequency control means connected to said sampling oscillator for maintaining the phase and frequency of said sampling oscillator and the intermediate phase and frequency of said burst of color synchronizing signal equal to each other.

References Cited in the file of this patent

Recent Developments in Color Synchronization in the RCA Color Television System, February 1950.

Philco TV Model 49–1175, Rider's Television Manual, vol. #3 Philco, page TV 3–20.